3,455,704
IMPROVED FLOOR POLISH COMPOSITIONS

Daniel A. Lima, Westport, Conn., and Theodore R. Hopper, Severna Park, Md., assignors to FMC Corporation, New York, N.Y., a corporation of Delaware
No Drawing. Filed Dec. 30, 1965, Ser. No. 517,780
Int. Cl. C09g 1/10
U.S. Cl. 106—6  3 Claims

ABSTRACT OF THE DISCLOSURE

This specification discloses floor polish compositions of the emulsion type consisting essentially of a major portion of a water-insoluble film former, including a waxy material, and a minor proportion of ammonia soluble leveling resin, and from 1 to 2% leveling agent, the improvement which consists in using as the leveling agent a neutral phosphate ester of the group consisting of tris (2-(2-butoxyethoxy)ethyl) phosphate and tris(2-(2-ethoxyethoxy)ethyl) phosphate.

---

This invention relates to improved floor polish compositions of the glossy-drying type, and more particularly to the use in these polishes of tris(2-(2-ethoxyethoxy) ethyl) phosphate or tris(2-(2-butoxyethoxy)ethyl) phosphate as leveling agents in such compositions.

Bright-drying floor polishes are generally aqueous emulsions comprising a water-insoluble film former which is either wax, or a waxy resin, with or without additional thermoplastic resin, together with a small percent of a resin which can be solubilized in water by the use of ammonia, and which acts as a leveling agent. These are invariably used in conjunction with a leveling additive which gives flexibility to the film and prevents crawling and crating. The most universally used additive for this purpose is tris(2-butoxyethyl) phosphate. This material has excellent properties, in that it combines fine leveling ability with good water resistance and very little to no effect on most substrates.

However, there are a few substrates on which tris(2-butoxyethyl) phosphate does have some softening effect. While this effect is not too objectionable in most cases, and can be overcome by keeping the use of the material to a minimum, it would be desirable to have a leveling agent which is less active in this regard. Attempts to find such leveling agents heretofore have been unsuccessful, because even such closely allied agents as tris(2-ethoxyethyl) phosphate are not satisfactory leveling agents. Even bis(2-butoxyethyl) mono ($C_6$–$C_{10}$n-alkyl) phosphate and di($C_6$–$C_{10}$n-alkyl) 2-ethoxyethyl phosphate do not do the leveling job properly.

We have found, surprisingly, two materials which are superior leveling agents for emulsion floor polishes, and can be used with less care than tris(2-butoxyethyl) phosphate. These materials are tris(2-(2-butoxyethoxy)ethyl) phosphate and tris(2-(2-ethoxyethoxy)ethyl) phosphate. It is quite surprising that these compounds both do the leveling job and have less solvent action than tris(2-butoxyethyl) phosphate, since more closely analogous materials are unsatisfactory.

These products, like other leveling agents, are used in floor polishes in rather low concentration of the order of about ¼ to 2 percent, depending on the solids content of the polish. These are generally of the order of 10 to 20% by weight, and optimum results are obtained at about 15% by weight solids with about 1% by weight of the leveling agent.

The water-insoluble film former may be a wax, or a wax substitute, such as carnauba, montan, paraffin, polyethylene, or Fischer-Tropsch waxes, and the like. These are blended, more often than not, with major quantities of thermoplastic resins, such as polystyrene, polyacrylate, and polyacrylate-acrylonitrile resins, chosen for both their good properties and their low cost. These resins are often sold blended with a small amount of shellac. These waxes and resins generally comprise about 75 to 90% of the total solids of the emulsion. Mixed with these materials are ammonia solutions of other thermoplastic resins, such as partially esterified rosin, and styrene/maleic copolymers, and other similar thermoplastics which are ammonia soluble. These ammonia solutions act to unify the film and level it somewhat, while at the same time the resins become water-insoluble along with the rest of the material on evaporation of the ammonia.

These resins and formulations are quite well known in the trade, being extensively described in the technical data bulletins of the various suppliers of the resins for the purpose.

The following typical examples of formulations in accordance with this invention are given by way of example, and not by way of limitation.

EXAMPLE 1

| | Parts by weight |
|---|---|
| Styrene polymer emulsion at 15% solids | 70 |
| Ammonia soluble resin at 15% solids | 15 |
| Polyethylene emulsion at 15% solids | 15 |
| Carbitol (diethylene glycol mono ethyl ether) | 1 |
| Tris(2-(2-butoxyethoxy)ethyl) phosphate | 1 |
| Dibutyl phthalate | 0.8 |

A film of the above polish was spread on vinyl and asphalt tile at a rate of about 1000 sq. ft. per gallon. Gloss, leveling and early water spot resistance were all excellent, and removability from both substrate with a standard ammoniacal potassium oleate soap solution was quick and complete.

The styrene polymer of this example is an emulsion of styrene with a small amount of shellac, purchased at 36% solids as RCI 40–201, and reduced to 15% solids. The ammonia soluble resin was a styrene/maleic copolymer. The polyethylene emulsion was a waxy grade with an ASTM E28 softening point of 214° F.

EXAMPLE 2

| | Parts by weight |
|---|---|
| Styrene polymer at 15% solids | 50 |
| Ammonia soluble resin at 15% solids | 25 |
| Polyethylene emulsion at 15% solids | 25 |
| Carbitol | 1 |
| Tris(2-(2-butoxyethoxy)ethyl) phosphate | 1 |
| Dibutyl phthalate | 0.5 |

A film of the above buffable polish was spread on vinyl and asphalt tile at a rate of about 1000 sq. ft. per gallon. Gloss, leveling and water resistance were all rated excellent.

This illustrates another formula with the same ingredients as Example 1.

EXAMPLE 3

Example 1 was repeated, except that tris(2-(2-ethoxyethoxy)ethyl) phosphate was substituted. Similar results were obtained.

EXAMPLE 4

Example 1 was repeated, except that a polyacrylate resin was substituted for the styrene polymer, with similar results.

EXAMPLE 5

Examples could be multiplied, but all would bear out essentially the same facts. Tris(2-(2-butoxyethoxy)ethyl)

and tris(2-(2-ethoxyethoxy)ethyl) phosphates aid in the formulation of successful floor polishes by:

(1) Causing a leveling of the film
(2) Acting as a plasticizer for the polymer emulsion
(3) Aiding in coalescence of the emulsions In addition, they have higher boiling points than tris (2-butoxyethyl) phosphate and therefore will remain longer in the film of polish. A further advantage lies in the fact that they are less severe in attack on asphalt and vinyl substrates, and this means that polish films can be used with very sensitive tiles.

EXAMPLE 6

| | Parts by weight |
|---|---|
| Blend of carnauba and microcrystalline | 80 |
| Paraffin wax emulsion at 15% solids styrene (maleic copolymer) | 18 |
| Aqueous ammonia solution at 15% solids tris(2-(2-ethoxyethoxy)ethyl) phosphate | 2 |

This formula illustrates the use of wax as the major component of a floor polish.

We claim:

1. In an improved floor polish composition of the emulsion type consisting essentially of from about 10% to 20% by weight of solids, based on the total weight of the composition, wherein the said solids consist essentially of a major portion of a water insoluble film former, including a waxy material, and a minor proportion of an ammonia soluble leveling resin, and from 1 to 2% leveling agent, the improvement which consists in using as the said leveling agent a neutral phosphate ester of the group consisting of tris(2-(2-butoxyethoxy)ethyl) phosphate and tris(2-(2-ethoxyethoxy)ethyl) phosphate.

2. The composition of claim 1 in which the leveling agent is tris(2-(2-butoxyethoxy)ethyl) phosphate.

3. The composition of claim 1 in which the leveling agent is tris(2-(2-ethoxyethoxy)ethyl) phosphate.

References Cited

UNITED STATES PATENTS

| 2,325,979 | 8/1943 | Sarback | 260—30.6 |
| 2,723,723 | 11/1955 | Ferrin | 260—950 XR |
| 3,072,492 | 1/1963 | Smith et al. | 106—4 |
| 3,247,141 | 4/1966 | Stryker et al. | |
| 3,290,264 | 12/1966 | Baranaucks et al. | |
| 3,328,325 | 6/1967 | Zdanowski. | |
| 3,352,805 | 11/1967 | Lima | 260—28.5 |

JULIUS FROME, Primary Examiner

JOAN B. EVANS, Assistant Examiner

U.S. Cl. X.R.

106—10, 11; 252—311; 260—28.5, 29.7, 30.6